Oct. 19, 1926.
E. KOTTUSCH
PISTON
Filed Nov. 24, 1923
1,603,611
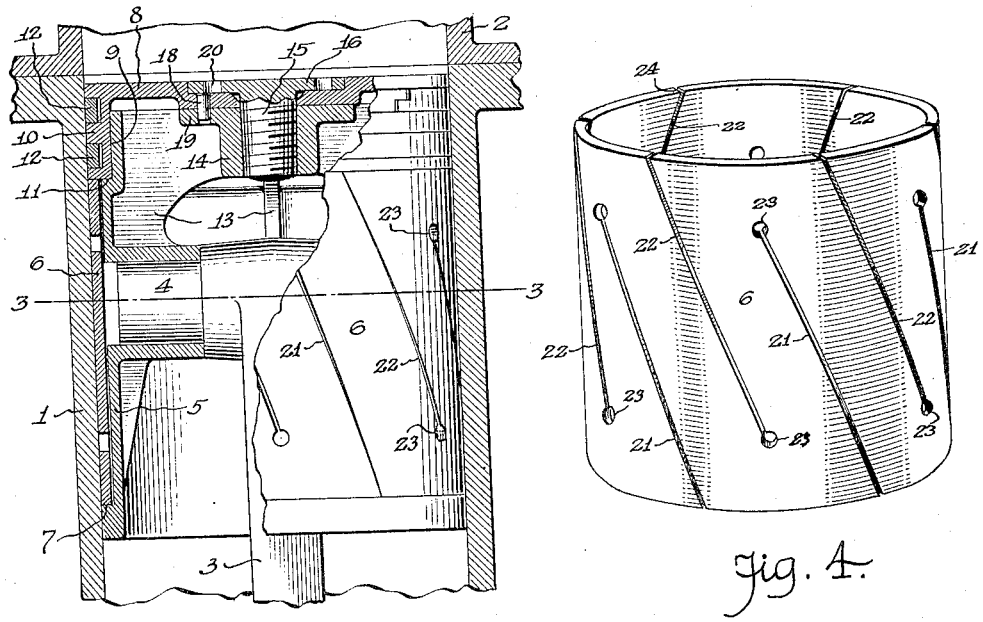
Fig. 1.
Fig. 4.
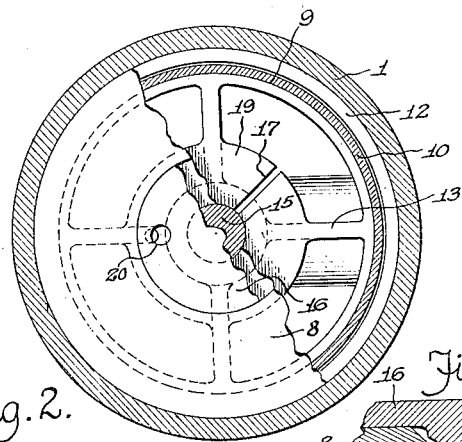
Fig. 2.
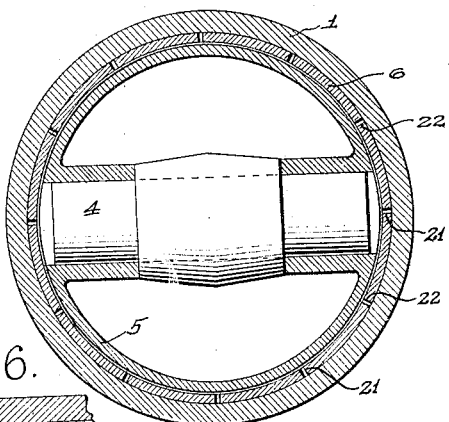
Fig. 6.
Fig. 3.
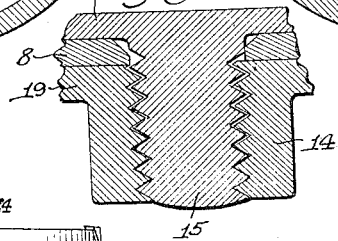
Fig. 5.
Inventor
Emil Kottusch,
By
Attorneys Patented Oct. 19, 1926.

1,603,611

UNITED STATES PATENT OFFICE.

EMIL KOTTUSCH, OF DETROIT, MICHIGAN.

PISTON.

Application filed November 24, 1923. Serial No. 676,681.

A desideratum in internal combustion engine construction is a piston of light weight and to secure such lightness, pistons have been formed from metals of low specific gravity, such as aluminum alloys. But as such alloys have a high co-efficient of expansion as compared with cast iron from which the cylinders are formed it is necessary to provide for this difference in expansion of the metals under the high heat conditions obtaining during engine operation. The usual practice is to slit or split the piston skirt, but such pistons do not fit accurately in the cylinder bores and the soft metal forming the skirt of the piston soon wears away causing "piston slap" due to the side thrust of the connecting rod upon the loose piston. Further, the slitted skirt permits an excessive amount of oil to reach the cylinder surface and work its way up past the packing rings, particularly after the rings have become worn, and further the loose piston skirt does not provide the desired guiding action and firm bearing upon the cylinder wall to prevent tilting of the piston in the cylinder bore under the thrust of its connecting rod, and consequent wear of piston and bore. Because of such loose fit of the skirt in the bore it is necessary to provide packing rings to prevent leakage past the piston, which rings in the ordinary construction, are a constant source of trouble, requiring frequent replacement and cannot be made to function properly due to such tilting action of the piston and the manner in which such rings are mounted upon the piston, nor can they be conveniently removed for replacement due to the manner of such mounting.

The object of the present invention is to provide a piston which is light in weight and the construction of which is such as to obviate the several objectionable features above pointed out as being inherent in pistons of this character as commonly constructed.

A further object is to provide a piston with a member providing an accurate fit in the bore of the cylinder and affording a long bearing to take the side thrust of the connecting rod, said member being expansible and contractible to provide for the difference in expansion between the metal forming the piston and the metal forming the cylinder, thus making it possible to form the piston of a metal having a high co-efficient of expansion. It is also an object to provide a piston so constructed as to form a carrier for the oil and distribute the same over the cylinder surface, at the same time preventing the oil from reaching the cylinder surface in excessive amounts and also serving to prevent leakage past the piston.

A further object is to provide a piston with a detachable and replaceable member which forms a wearing surface and is held in place in such a manner that it may be readily removed without the necessity for dismantling the engine, at the same time facilitating the replacement of packing rings where such rings are used.

With the above and other ends in view the invention consists in the several matters hereinafter set forth and more particularly pointed out in the appended claims, reference being had to the accompanying drawing in which, Figure 1 is a longitudinal vertical section through a cylinder with a piston therein embodying the invention and shown partly in section and partly in side elevation;

Fig. 2 is a transverse section of Fig. 1, with the piston shown partly in section and partly broken away to more clearly disclose the construction;

Fig. 3 is a similar section substantially upon the line III—III of Fig. 1;

Fig. 4 is a perspective view of a piston sleeve embodying features of the invention;

Fig. 5 is a detail of the sleeve shown in Fig. 4, and showing the sleeve in side elevation to illustrate the manner in which it is formed and the way in which it expands, and Fig. 6 is a sectional detail illustrative of the manner in which a head of the piston is secured in place upon its skirt.

In the accompanying drawing, 1 indicates an engine cylinder as commonly constructed with a detachable head portion 2, and 3 indicates a connecting rod having a wrist pin 4 engaging suitable bearings in the skirt member 5 of the piston, which skirt member is preferably formed imperforate to prevent oil splashed upwardly therein from passing through the skirt into contact with the surface of the cylinder wall 1. This piston skirt 5 is turned down upon its exterior to receive an expansive sleeve 6 and to form a shoulder near the lower end of the skirt which shoulder provides an abutment for the lower end of the sleeve. The upper end of the piston is closed by a detachable head 8, the upper end portion of the skirt being turned down as at 9, to receive the depending flange 10 of the head and to form a shoulder 11 upon which the lower end of the flange is adapted to seat, the flange fitting closely over the turned down upper end of the sleeve. The flange 10 is of an external diameter to closely fit the bore of the cylinder and the lower end of its downwardly extending flange not only seats upon the seat 11 but is engaged by the upper end of the sleeve 6 so that when the head is secured in place upon the skirt, the sleeve 6 is clamped and held between the lower end of the flange 10 on the head and the shoulder 7 at the lower end of the piston skirt.

If found desirable the flange 10 of the piston head may be provided with one or more grooves in its outer surface to receive packing rings 12 constructed and arranged in an old and well known manner common in gas engine piston construction.

The skirt 5 of the piston is internally formed with transverse webs 13 constructed and arranged in any suitable manner to strengthen the skirt, brace the bearings for the wrist pin 4 and support the head of the piston. These webs also carry an axial boss 14 at the upper end of the skirt, which boss is bored to receive a locking screw 15 for holding the piston head 8 seated upon its seat 11 on the skirt. This locking screw 15 has a flat head 16 and the piston head 8 is recessed to receive this head 16 of the locking screw so that when the parts are in place the upper surface of the piston will be flat and smooth. In order to lock the screw against accidental displacement in use, the boss 14 is bored out with a slight taper as illustrated in Fig. 6 and is screw threaded to receive the screw 15 which is of the same diameter throughout its length, and to permit the straight screw to enter the tapered and screw threaded bore of the boss 14, said boss is split as shown at 17 so that it will give slightly when the screw is turned in and provide a yielding grip on the screw which will prevent the screw from backing out in use and will thus firmly lock the screw in place.

To prevent relative rotation between the piston head 8 and its skirt 5, a pin 18 is set in the head to engage an opening in a flange 19 extending laterally from the boss 14 at its upper end. The head may therefore be slipped into place over the reduced upper end of the piston skirt with the pin 18 entering the opening in the skirt and the head then locked firmly in place and forced downwardly to its seat 11 on the skirt, by means of the screw 15, the head 16 of which is provided with openings 20 to receive a tool by means of which the screw may be conveniently turned. In this construction the head may be readily removed from the piston at any time without the necessity for disconnecting the connecting rod, by simply removing the cylinder head 2 and then removing the screw 15 to release the piston head which may then be lifted off from the upper end of the skirt. The slit 17 in the boss allows oil to reach the screw thread of the screw at all times and prevents the screw from becoming burned in and sticking so that it can be readily taken out at any time. As the packing rings 12 are carried by the head, the removal of the head permits of the ready replacement of these rings without the necessity for disconnecting the connecting rod and removing the entire piston from the cylinder. The removal of the head also permits of the ready removal of the sleeve 6 without the necessity for removing the entire piston and should this sleeve become worn in use a new one may be readily slipped into place over the piston within the cylinder and the head then secured to the piston skirt to secure the sleeve in place and to contract it upon the piston in the manner hereinafter described.

The sleeve C which is of a length to cover a major portion of the length of the piston, may be formed of any suitable material and from a tube which is of slightly greater external diameter than the internal diameter of the cylinder 1. This tube after being cut to approximately the desired length is slitted longitudinally inward from each end, the slits extending inward from one end alternating with those extending inward from the opposite end, these slits 21 and 22 being preferably inclined in the direction of the length of the sleeve so that they overlap, each slit terminating in a hole 23 bored in sleeve. After the tube has been slitted as shown in Fig. 4, which slitting makes the tube yieldable or compressible by reason of the spring of the metal between the slits, this slit tube is contracted by means of a sleeve or other device slipped over the tube, until the open ends of the slits are closed. The ends of the tube or sleeve are then turned off to the exact length or distance between the shoulder 7 of the piston skirt and the lower end of the piston head when seated against the shoulder 11 on the skirt. The sleeve is then clamped between members engaging the ends of the sleeve while it is in contracted condition to hold it in that condition and is then slipped upon a suitable mandrel and the outside surface of the sleeve is turned down to a size to fit accurately within the cylinder bore. After the turning operation and the release of the sleeve from the mandrel and its clamp this sleeve will at once expand, the free ends of the slits opening up, and as the ends of the sleeve have been turned to the exact length desired while the sleeve was contracted and the slits closed, upon the release of the sleeve and the expansion thereof, the acute angles 24 where the slits cut through the ends of the sleeve, will move longitudinally of the sleeve as these slots open and each angle 24 will project slightly longitudinally of the sleeve beyond the obtuse angle at the opposite side of the slit, as illustrated in Fig. 5.

With the piston skirt removed from the cylinder 1, the sleeve 6 may be slipped freely over the skirt, the internal diameter of the sleeve being considerably greater than the external diameter of the turned down portion of the skirt and these diameters are so proportioned that when the sleeve is fully contracted, its internal diameter is still considerably greater than the external diameter of that portion of the piston over which it is engaged. The piston head 8 is then slipped into place and by means of the securing screw 15 is forced down hard against the shoulder 11 on the skirt and against these projecting angle corners 24 of the sleeve which corner angles are thereby forced longitudinally of the sleeve, thus closing the ends of the slits 21 and 22 and contracting the sleeve. The inherent springiness of the metal of the sleeve tends at all times to open the ends or separate the slits 21 and 22 and thus a force is exerted which holds these sharp angles 24 in firm contact with the shoulder 7 and the end face of the flange 10 of the head. This tendency of the sleeve to expand and the prevention thereof by the clamping of it endwise, prevents undue expansion of the sleeve within the cylinder and at the same time prevents rotation of the sleeve upon the piston skirt, and as the sleeve is turned down while in its contracted condition to a diameter to accurately fit within the cylinder bore, this sleeve, when in place upon the piston and in clamped and contracted condition thereon, forms an accurate and extended bearing surface for the piston in engagement with the cylinder bore. As the sleeve 6 is of greater internal diameter when in its contracted condition than the external diameter of that portion of the piston skirt over which it is engaged, said skirt is always free to expand under heat, within the cylinder bore, and therefore the piston may be formed of a metal having a much reater co-efficient of expansion than that of the metal forming the cylinder. At the same time the sleeve is always compressible and may yield under differences in contraction and expansion between it and the cylinder and between the piston and cylinder. The sleeve which forms the wearing surface of the piston may therefore be made from a metal different from that of the piston or different from that from which the cylinder is formed and as this sleeve is normally held against expansion upon the piston which expansion is due to the springiness of the metal, the diameter of this sleeve is maintained to accurately fit the cylinder bore and thus maintain close contact therewith to provide a long even bearing for the piston upon the surface of the cylinder and prevent side slap or lateral movement of the piston due to the angular thrust of the connecting rod thereon. This fit of the sleeve within the cylinder bore is maintained at such an accuracy and the length of sleeve is so great that in some instances the use of the packing rings 12 may be dispensed with and the sleeve will also perform the functions of a packing ring to maintain a tight joint between the piston and cylinder wall, sufficient to prevent leakage of compression past the piston and of the travel of oil upwardly into the compression chamber above the piston.

It will be noted that the wall of the skirt 5 is imperforate except at the bearings for the wrist pin 4, and these openings are closed by the wrist pin. Therefore, any oil splashed upwardly through the open lower end of the piston skirt cannot reach the surface of the cylinder through the piston, but the slits 21 and 22 in the sleeve perform the function of oil carrying grooves which will carry sufficient oil to effectually lubricate the surface of the cylinder bore without permitting an excessive accumulation of oil which would cause the oil to work up past the piston. It will be noted that the slits 21 and 22 are all inclined in the same direction and that the ends of each slit overlap the ends of adjacent slits in longitudinal planes of the sleeve, and therefore oil contained in these slits will lubricate every part of the cylinder surface and the up and down motion of the piston will cause a travel of the oil around the piston to further insure proper lubrication.

The ends of the sleeve are maintained in firm contact with the shoulder 7 and flange 10 of the head, by the tendency of the sleeve to expand and in so doing project its angles 24 longitudinally of the sleeve and therefore a tight joint is maintained at the ends of the sleeve to prevent the oil in the slits from working up past the piston.

A piston of this construction may therefore be very light in weight as the entire skirt and head of the piston may be formed of a metal of low specific gravity and the sleeve may be formed of a different metal which will have the desired wearing qualities in contact with the cast iron cylinder, thus preventing undue wear and consequent lateral movement of the piston in the cylinder which would soon wear the cylinder out of round, cause leakage past the piston and noise due to the lateral movement of the piston in the cylinder. It may be further pointed out that the construction of the wear sleeve is such that it may be compressed into and will conform to the shape of the cylinder bore when a piston of this construction is applied to an old engine, and if the cylinder bore should be out of round, this sleeve will conform thereto and due to its expansive force will gradually reform the cylinder bore. It is therefore unnecessary when applying a piston of this construction to an old engine, to rebore the cylinder.

Changes in the size and proportion of parts and their construction and arrangement to suit the different conditions of installation and application, are contemplated, and such changes as fall within the scope of the appended claims may therefore be made without departing from the spirit of the invention.

What I claim is:—

1. A piston comprising a skirt, a longitudinally expansible sleeve mounted upon said skirt with a space between said skirt and sleeve, said skirt being formed with an annular shoulder to engage the lower end of the sleeve and with an axial boss near its upper end formed with a screw threaded bore, a piston head engaging the upper end of the skirt and the upper end of the sleeve, and a screw engaging the head and entering the bore for detachably securing the head to the skirt and forcing said head into contact with the upper end of the sleeve to contract the sleeve longitudinally.

2. A piston comprising a skirt having an axial boss provided with a screwthreaded bore and split longitudinally, a head on the skirt having an axial opening, and a screw passing through said opening in the head and engaging the bore to detachably secure the head to the skirt, said screw and bore being relatively tapered longitudinally.

3. A piston comprising a skirt, a sleeve on said skirt formed with slits extending inwardly from its ends in an inclined position relative to the axis of the sleeve, the portions between the slits being extended longitudinally at one side of the end of each portion beyond that of the other side to form longitudinal projections on said portions, and means on said skirt to engage said projections and clamp the sleeve endwise.

In testimony whereof I affix my signature in presence of two witnesses.

EMIL KOTTUSCH.